V. A. BOKER.
TRACTOR.
APPLICATION FILED AUG. 6, 1913.
1,202,783.
Patented Oct. 31, 1916.
4 SHEETS—SHEET 4.
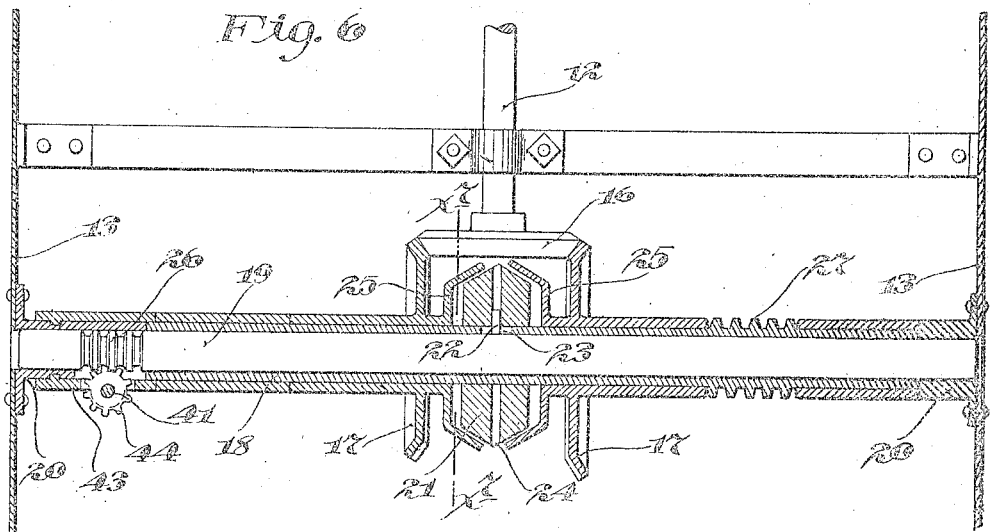
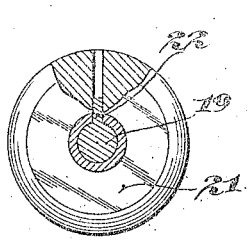
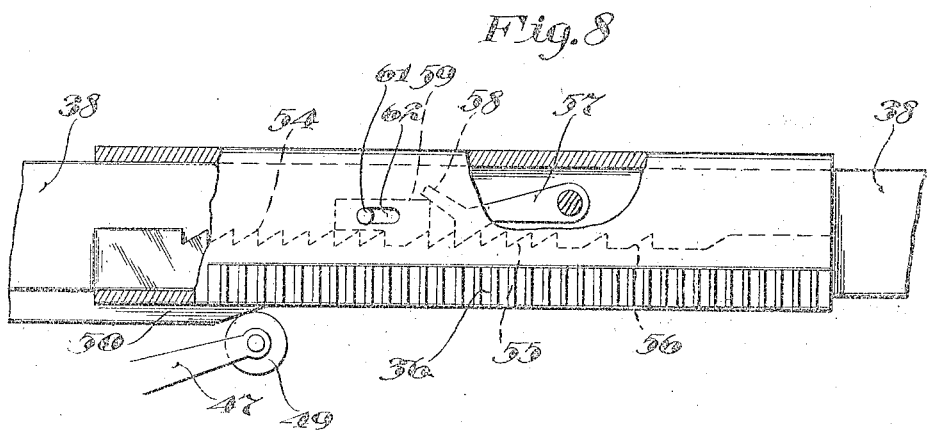
Witnesses
E. C. Skinkle
Geo. Knutson
Inventor
Vito A. Boker
By his Attorneys
Williamson & Mackint

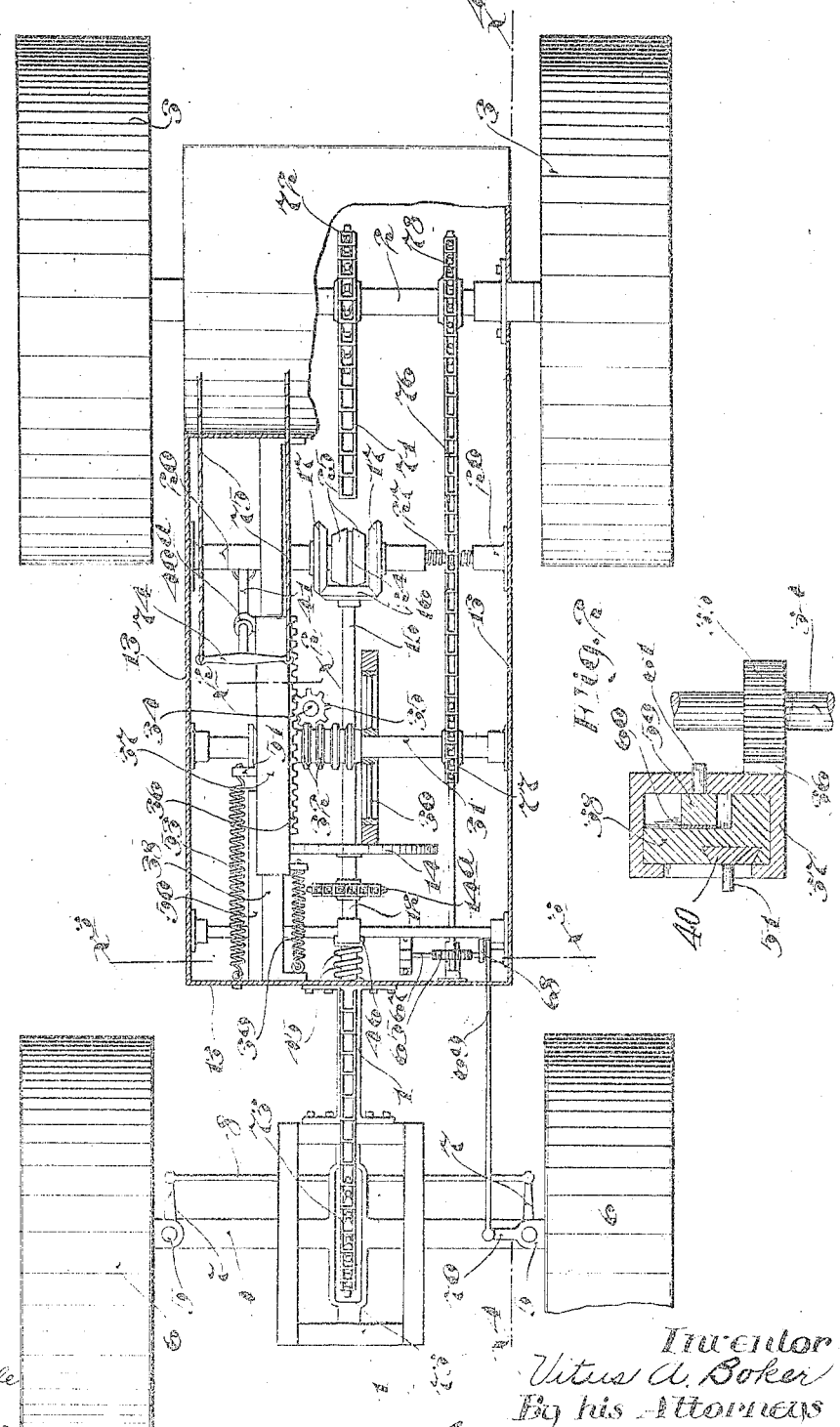

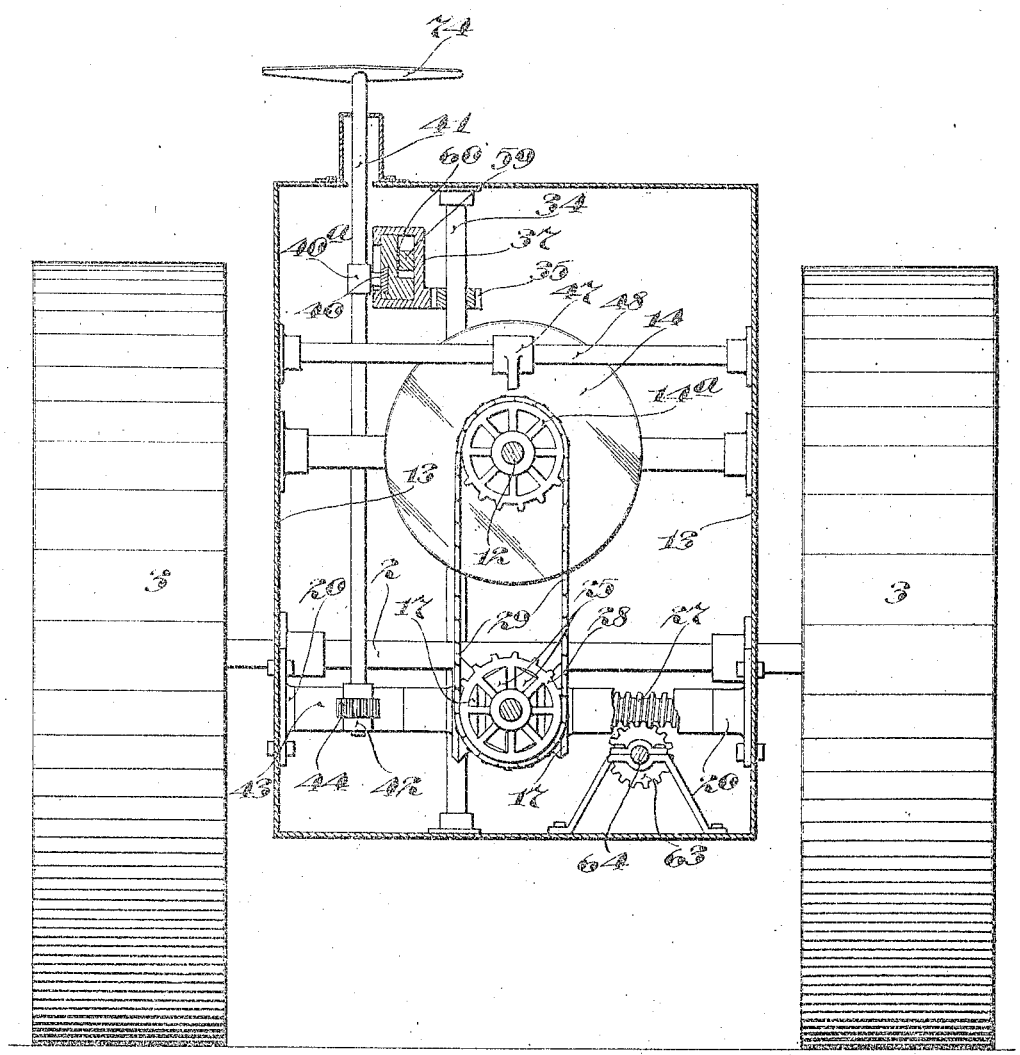

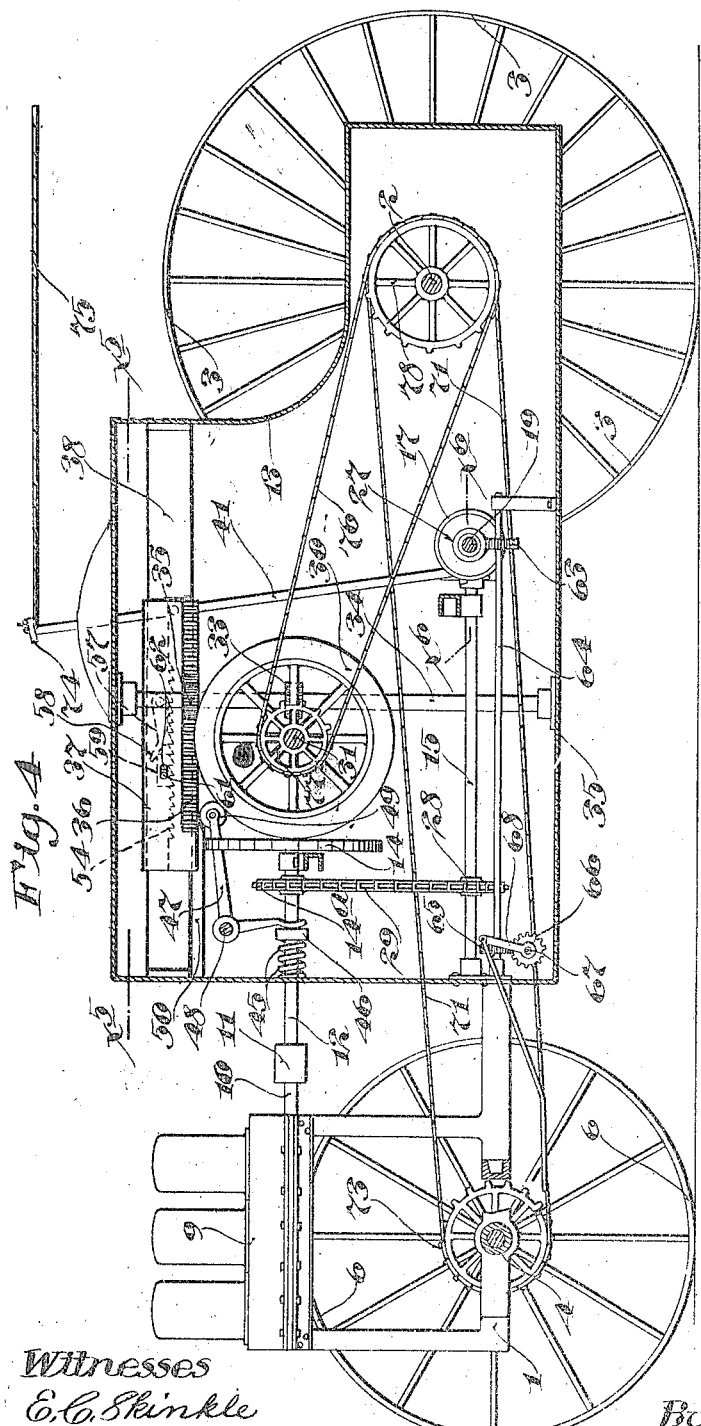

UNITED STATES PATENT OFFICE.

VITUS A. BOKER, OF MINNEAPOLIS, MINNESOTA.

TRACTOR.

1,202,783.  Specification of Letters Patent.  Patented Oct. 31, 1916.

Application filed August 6, 1913. Serial No. 783,292.

*To all whom it may concern:*

Be it known that I, VITUS A. BOKER, a citizen of the United States, residing at Minneapolis, in the county of Hennepin and State of Minnesota, have invented certain new and useful Improvements in Improved Tractors; and I do hereby declare the following to be a full, clear, and exact description of the invention, such as will enable others skilled in the art to which it appertains to make and use the same.

My invention relates to tractors or motor propelled vehicles, and has for its object, first, to provide an improved variable speed transmission mechanism, and second, to provide a common controller and coöperating device by means of which both the speed of travel and the direction of travel of the tractor may be controlled.

In designing the controller I have provided an arrangement whereby the speed and the direction of travel of the tractor may be controlled by an action that is substantially like that required to drive a horse. If it be assumed that a horse is trained to decrease speed under an increasing pull on the reins, which is frequently the case, and that he is guided by pulling harder on the one rein than on the other, which is always the case, then the analogy between the actions required to control the speed and direction of the tractor, by the use of my improved controller, and those required to drive a horse, is very close.

This controller, as above intimated, has connections both to variable speed transmission mechanism and to the steering mechanism proper. It is arranged for movements on one line, to adjust transmission mechanism, and for movements on another line, to adjust the steering mechanism. Preferably, the controller is yieldingly pressed forward and has a pair of rearwardly extended reins, the arrangement being such that by equal tension on both lines, the said controller may be drawn rearward, to adjust the transmission mechanism for speed, and by pulling on the one rein harder than on the other, the steering mechanism may be adjusted for direction of travel.

The transmission mechanism, in itself, involves numerous novel features, certain of which are particularly adapted for use in connection with a common controller therefor, and for the steering mechanism.

Certain novel features herein disclosed and which are classified as "gearing" are disclosed and claimed in Letters Patent of the United States No. 1,111,355, granted to me of date, September 22, 1914, and entitled "Transmission mechanism", and the application of which patent was filed as a division of the present application.

In the accompanying drawings which illustrate the invention, like characters indicate like parts throughout the several views.

Referring to the drawings: Figure 1 is a plan view showing a tractor embodying my invention, some parts being broken away and some parts being sectioned; Fig. 2 is a detail in section on the lines $x^2$—$x^2$ on Figs. 1 and 8; Fig. 3 is a transverse section taken approximately on the line $x^3$—$x^3$ on Fig. 1; Fig. 4 is a longitudinal section taken approximately on the line $x^4$—$x^4$ on Fig. 1; Fig 5 is a detail view in horizontal section taken approximately on the line $x^5$—$x^5$ on Fig. 4; Fig. 6 is a transverse horizontal section taken approximately on the line $x^6$—$x^6$ on Fig. 4; Fig. 7 is a detail in section taken approximately on the line $x^7$—$x^7$ on Fig. 6, some parts being broken away; Fig. 8 is a detail view in side elevation of certain of the parts shown in Fig. 5, some portions being broken away.

The tractor may be of any type, and, as shown, it comprises a truck frame 1, rear axle 2, and rear traction wheels 3, front axle 4 having pivoted stub axles 5, and front or steering wheels 6 journaled on the said stub axles. The stub axles 5, as is usual, are provided with parallel arms 7 connected by a cross link 8 which causes the said wheels 6 to partake of parallel angular steering movements, this being the customary construction. As a motor for propelling the tractor, a multi-cylinder explosive engine 9 is preferably employed, and this, as shown, is supported on a raised front end portion of the main frame 1. The engine crank shaft 10, as shown, is connected by a telescopic or slip coupling 11, to the front end of a main dividing shaft 12 that extends longitudinally of the tractor and is journaled in suitable bearings, shown as supported by a strong casing 13 that is rigidly secured on the truck frame 1. Within the casing, this main driving shaft 12 carries a sprocket 14$^a$, and a face friction wheel 14. Mounted in suitable bearings on the casing 13, and located immediately below the main driving shaft 12, but extending rearward therefrom, is a counter shaft 15 provided at its rear end with a beveled gear 16, which latter is located at the rear end of said shaft. The beveled gear 16 meshes with opposed beveled gears 17 having sleeve-like hubs that are journaled on a tubular shaft 18, that surrounds a transverse counter shaft 19, the ends of which latter are journaled in suitable bearings 20 on the sides of the casing 13. The counter shaft 19 is capable of a slight endwise movement. Mounted for sliding movement on the intermediate portion of the tubular shaft 18 is a reversely beveled friction clutch head 21. The counter shaft 19 is provided with radial projecting stud 22 (see Figs. 6 and 7) that extends through a slot 23 in the tubular shaft 18 and into a radial perforation 24 of the clutch head. This stud 22 causes the tubular shaft 18 and clutch head 21 to rotate with the counter shaft 19 and permits the said counter shaft 19 to move endwise, so as to throw the clutch head 21 into frictional contact with either one of a pair of internal frictional clutch flanges 25 shown as secured to the inner ends of the sleeve-like hubs of the beveled gears 17. Near one end, the shaft 19 is provided with circumferentially extended rack teeth 26, for a purpose which will hereinafter appear, and near one end the tubular shaft 18 is provided with a worm or spiral threads 27, for a purpose which will also hereinafter appear. The said counter shaft 15 is provided with a sprocket 28, over which, and the sprocket 14ª on the shaft 12, runs a sprocket chain 29, so that the said shaft 15 is closely driven from the said shaft 12.

The so-called face friction wheel 14 on the shaft 12 constitutes one element of the variable speed transmission mechanism proper, and the face of this wheel is arranged for frictional engagement with the periphery of a peripheral friction wheel 30 that is keyed for rotation with, but for sliding movements on a transverse shaft 31 that is journaled in suitable bearings on the casing 13. The hub of the friction wheel 30 is formed with a plurality of endless circumferentially extended rack teeth 32 that mesh with a pinion 33 secured on the intermediate portion of an upright shaft 34 (see Figs. 1, 2 and 4), which shaft is journaled in suitable bearings on the top and bottom of the casing 13. The shaft 34 carries an upper spur pinion 35 which, as shown, is of the same size as the spur pinion 33, so that in Fig. 1, it appears to mesh with the endless rack 32, but is located far above the same and is in mesh with the rack teeth 36 of a tubular rectangular rack bar or casing 37, which latter is mounted to slide forwardly and rearwardly on a fixed horizontal guide bar 38 secured at its ends to the upper portion of the casing 13. A coiled spring 39 attached to the rack bar 37 and to the guide bar 38 yieldingly draws the said rack bar forward.

The numeral 40 indicates a so-called primary speed regulating slide, the purpose of which will presently appear, and which slide is mounted for sliding movements in the fixed bar 38 and is provided at its rear end with a laterally projecting swiveled bearing 48ª.

The chief element of the common controller for the transmission mechanism and steering mechanism, is preferably in the form of an upright rod 41, the upper portion of which is supported by and journaled in the swiveled bearing 40ª, and the lower end of which is journaled with freedom for forward and rearward movements in a vertical plane, in vertically spaced bearing lugs 42 (see Figs. 3 and 6), of a sleeve 43 that is swiveled on the left hand end of shaft bearing 20. Between the lugs 32, the said controller rod 41 is provided with a spur gear 44 that is in constant mesh with the endless rack teeth 26 of the clutch actuated shaft 19.

It will be remembered that the shaft 12 is capable of slight endwise movement. This is to permit the face friction wheel 14 to be moved into and out of frictional engagement with the peripheral friction wheel 30. For yieldingly pressing the said wheel 14 against the wheel 30, a coiled spring 45 (see Fig. 4) is placed around the shaft 12 and compressed between the casing 13 and a flange 46 on the said shaft. The said flange 46 is engaged by the depending arms of a bell crank 47 that is pivoted on a transverse supporting rod 48 secured at its ends to the sides of the casing 13. The upper arm of the said bell crank is preferably equipped with a roller 49 that is adapted to be engaged by a cam acting rib 50 of the primary slide 40, heretofore noted. A stud 51 projects from the slide 40 and works in a slot 52 of the tubular secondary slide 37, so that the said slide 40 has a limited sliding movement in respect to the said slide 37. A coiled spring 53 attached to the casing 13 and to the stud 51, puts the slide 40 under a strain to move forward.

The fixed bar 38 (see Figs. 4, 5 and 8) is provided with rack teeth that are preferably divided into several longitudinally spaced groups 54, 55 and 56. The tubular slide 37 is provided with a pivoted dog 57 that is normally gravity-held in engagement with certain of the rack teeth 54, 55 or 56, and is provided with an oblique nose 58 adapted to be engaged by a tripping block or abutment 59, that has frictional engagement with one inner wall of the tubular slide 37 and with the adjacent face of the fixed rack bar 38, but is given the greater frictional engagement with the latter, by means of a leather or similar facing 60 secured to said block. The said block, however, is provided with a projecting stud 61 that works in a short longitudinal slot 62 in the adjacent wall of the tubular slide 37. The transmission mechanism has now been described.

The worm 27, clutches 21 and 25, shaft 19, and pinion 44, constitute elements of the steering mechanism proper, which steering mechanism as illustrated, also includes the following devices. The said worm 27 meshes with a worm gear 63 which is secured on the rear end of a counter shaft 64 journaled in suitable bearings on the casing 13 and provided at its front end with a skew gear 65 (see Figs. 1 and 4). This skew gear 65 meshes with a similar skew gear 66 secured on a short transverse crank shaft 67 journaled in suitable bearings on the casing 13 and provided with an upwardly extended crank arm 68. This crank arm 68 is connected by a link 69 to an arm 70, which projects inwardly from one of the front stub axles 5. The steering connections have now been described.

As further elements of the common controller for the transmission and steering mechanisms, the controller rod 41 is provided at its upper end with a cross arm 74, that is rigidly secured thereto at its intermediate portion. The controlling reins or lines 75 are secured at their front ends to the opposite ends of the said head 74. These reins may extend rearward to any suitable point, such, for instance as to a platform of a gang plow, or to the working platform or within reach of the seat of a harvester, and if desired, any suitable means may be provided for anchoring the rear ends of the said reins. Usually, however, these reins will be held in the hands of the operator.

The tractor illustrated is of the type wherein all of the wheels are positively driven, and hence, utilized as traction wheels. This is accomplished by a long sprocket chain 71 which runs over a sprocket 72 on the rear axle 2 and over a front sprocket 73 which is connected by a guide shaft, not shown, to the hubs of the front wheels. This wheel driven connection, however, constitutes no part of the present invention, and for that reason, has not been more fully illustrated. A sprocket chain 76 runs over sprocket wheels 77 and 78 respectively, on the shaft 31 and rear axle 2.

Operation: First, as to the steering connections, it will be understood from the foregoing description, that the two beveled gears 17 are constantly driven in opposite directions, and that the controller rod 41 and its gear 44 may be oscillated in the one direction or the other, by a greater pull on the one rein or operating line 75 than on the other. The engagement between the pinion 44 and the endless rack teeth 26 of the clutch operating shaft 19 permits free rotation of the said shaft, and by the oscillating movements of the said pinion just noted, the said shaft may be moved endwise to force the one clutch head 21 into engagement with either the right hand or left hand clutch flanges 25. In this way, the tubular shaft 18, and its worm 27 may be coupled at will to either of the continuously running reversely driven gears 17. Obviously, when the worm 27 is driven in one direction, it will, through the connections described, move the steering link 69 forward, while, when it is driven in the opposite direction, it will move the said link 69 rearward. In this way, the parallel steering movements are, by the power of the engine, imparted to the front wheels 6. Of course, when the clutch head 21 is moved into an intermediate position, it will not be engaged with either of the clutch flanges 25, and hence, the worm 27 will remain stationary, and the wheels 6 held in any adjustment in which they may be set. The engagement between the worm 27 and the worm gear 63 serves as a lock to maintain such adjustment.

The adjustment of the transmission mechanism for different speeds is, as already indicated, accomplished by forward and rearward movements of the upper end of the controller rod 41, produced by pulling on or releasing the reins 75. In the arrangement illustrated, the speed will be decreased as the upper end of the controller rod 41 is pulled rearward to a certain point which sets the peripheral friction wheel 30 in the vertical plane of the axis of the face friction wheel 14, and further rearward pull beyond this point will reverse the action of the transmission mechanism.

Specifically described, the adjustments of the transmission mechanism for different speeds and reversal, are as follows: Normally, or after each adjustment for speed has been made, the so-called primary slide 40 will, by its spring 53, be returned to its most forward position shown in Figs. 4, 5 and 8. The initial rearward movement of the said primary slide 40 causes its cam rib 50 to engage the roller 49 of the bell crank 47, and operates through the latter, to move the face friction wheel 14 out of engagement with the peripheral friction wheel 30. This preliminary action makes the lateral adjustment of the friction wheel 30, a very easy matter. When the slide 40 is drawn rearward far enough to engage its stud 51 with the rear limit of its slot 52 of the secondary slide 37, and this rearward movement of the said primary slide 40 is continued, the secondary slide will be caused to move rearward in opposition to the tension of its spring 39. The dog 57, by its engagement with the teeth 54, 55 or 56, as the case may be, will temporarily lock the secondary slide 37 to the fixed bar 38. The movement of the secondary slide 37, operating through the rack 36, shaft 34, pinions 33 and 35, and endless rack teeth 32, causes the friction wheel 30 to move laterally toward and from the axis of the friction wheel 14, so that it will be seen that the position of the said wheel 30 will depend on the position of the secondary slide 37. The farther forward the secondary slide 37 is moved and set, the farther the friction wheel 30 will be set from the axis of the friction wheel 14, and, consequently, the greater the speed. The converse of this statement is also, of course, true. For reversal, to drive the tractor backward, the slide 37 is set rearward far enough to engage the pawl 57 with the ratchet teeth 56 of the fixed bar 38, and this will carry the friction wheel 30 laterally to the slide end side of the axis of the wheel 14. Reversal will be under slow speed.

When the secondary slide 37 has been drawn rearward and hooked up or secured by the dog 57, as just stated, the friction wheel 14 will not be reëngaged by the friction wheel 30 until the primary slide 40 has been permitted to move forward to its normal position, thereby throwing its cam rib 50 out of engagement with the wheel 49 of the bell crank 47, whereupon the spring 45 will again exert its pressure to hold the said friction wheel 14 in frictional driving engagement with the said friction wheel 30. It will thus be seen how the secondary slide 37 may be moved rearward and set in different positions, for any desired forward speed, or for reversal.

The dog tripping block 59 tends to stick to the fixed bar 38, but when its stud 61 reaches the limit of the slot 62, it will be positively caused to move with the secondary slide 37. When the dog 57, which is carried by the secondary slide, is engaged with one of the teeth 55, as best shown in Fig. 8, the tripping block 59 will stand in the position shown in the said view. The dog 57 is released from the ratchet teeth of the bar 38 by engagement of its nose 58 with the tripping block 59, at a time when the secondary slide 37 is given forward movement, and while the said block is frictionally held to the fixed bar 38. But in the position of the parts shown in Fig. 8 the said slide 37 cannot be given sufficient forward movement to accomplish this result, because of the close engagement between the said dog 57 and the teeth of the said bar 38. To accomplish this release of the dog 57, the slide 37 must be drawn forward to a position in which the dog 57 will engage the long clearance passage between the teeth 55 and 56. When the dog is brought to this position and the slide 37 is moved rearward, the nose 58 of the said dog will be cammed upward by the block 59 and the dog released while the said dog is frictionally held or stuck to the fixed bar 38, and while its stud 61 is moving rearward in the slot 62 of the said secondary bar 37. After the dog has been released, the stud 61 and slot 62 will cause the tripping block 59 to move rearward with the said secondary slide 37. The release of the dog 57 may be also accomplished from a position in which it is engaged in the long notch between the teeth 54 and 55.

It will thus be seen that the tripping block 59 has a slight movement in respect to the secondary slide 37, necessary to release the dog 57, but that after such movement is accomplished, it moves or travels with the said slide and will always be set in a position to release the dog under an initial forward movement of the slide that is slightly greater than the length of the teeth 54 and 55. When the dog 57 has been released, as above stated, the slide 37 may be moved or permitted to move under the action of its spring 39, forward to a position for maximum forward speed, or may be stopped in an intermediate point and interlocked with any one of the teeth 54 or 55, simply by giving the said slide 37 the proper rearward movement while its dog 57 is released by the block 59 and then a slight forward movement away from the tripping block 59. Under this forward adjustment, the secondary slide 37 may be locked where desired, but the friction wheel 14 will not be reëngaged by the friction wheel 30 until the primary slide 40 has reached or approximately reached the limit of its forward movement.

From the foregoing, it is thought to be clear how the common controller is operated, under movement in one direction, to control the steering mechanism, and under another movement, to control or adjust the variable speed transmission mechanism. These two adjustments may be accomplished independently or at different times, or may be accomplished simultaneously, by imparting to the controller rod 41 an oscillatory movement on its own axis while it is being given a forward or rearward movement.

What I claim is:

1. In a motor-propelled vehicle, the combination with a steering mechanism and a motor driven transmission mechanism, of a common controller operatively connected to said two mechanisms and having two actions, the one for controlling said steering mechanism, and the other for controlling said transmission mechanism.

2. In a motor propelled vehicle, the combination with a steering mechanism and a variable speed transmission mechanism, of a common controller for the said two mechanisms, mounted for movement on two different lines, the movement on one line serving to regulate the speed and the movement on the other line serving to regulate the direction of travel.

3. In a motor propelled vehicle, the combination with a steering mechanism and a variable speed transmission mechanism, of a common controller for the said two mechanisms, the said controller having extended reins whereby it may be operated from a distant point.

4. In a motor propelled vehicle, the combination with a steering mechanism and a variable speed transmission mechanism, of a common controller for the said two mechanisms, mounted for movement on two different lines, the movement on one line serving to regulate the speed and the movement on the other line serving to regulate the direction of travel, the said controller having extended reins operated when both are pulled equally to impart one adjustment to said controller and operating when one rein is pulled harder than the other to impart the other movement of the said controller.

5. In a motor propelled vehicle, the combination with a steering mechanism and a variable speed transmission mechanism, of a common controller for said two mechanisms, operatively connected to both thereof, and mounted for forward and rearward movements to adjust said transmission mechanism and for oscillating movements on its own axis to adjust said steering mechanism.

6. In a motor propelled vehicle, the combination with a steering mechanism and a variable speed transmission mechanism, of a common controller for said two mechanisms operatively connected to both thereof and mounted for forward and rearward movements to adjust said transmission mechanism and for oscillating movements on its own axis to adjust said steering mechanism, said controller having a head projecting in opposite sides of its axis, and reins attached to the opposite ends of said head and extended therefrom.

7. In a motor propelled vehicle, the combination with a steering mechanism and a variable speed transmission mechanism, of a common controller for said two mechanisms operatively connected to both thereof and mounted for forward and rearward movements to adjust said transmission mechanism and for oscillating movements on its own axis to adjust said steering mechanism, said controller having a head projecting in opposite sides of its axis, and reins attached to the opposite ends of said head and extended therefrom, and yielding means tending to move said controller in a direction opposite to the direction in which it is moved longitudinally of the tractor, by pulling on said reins.

8. In a motor propelled vehicle, the combination with a steering mechanism and a reliable speed transmission mechanism, the latter including coöperating friction wheels, of a relatively fixed guide, primary and secondary slides mounted on said guide and under yielding strain to move in a common direction, a connection between said secondary slide and one of said friction wheels, for adjusting the same, a connection operated by said primary slide arranged to separate said friction wheels while the one is being adjusted in respect to the other, means for locking said secondary slide in different positions for different speeds, and a common controller connected to said primary slide and to said steering mechanism.

9. In a motor propelled vehicle, the combination with a steering mechanism and a variable speed transmission mechanism, the latter including coöperating friction wheels, of a relatively fixed guide, primary and secondary slides mounted on said guide and under yielding strain to move in a common direction, a connection between said secondary slide and one of said friction wheels, for adjusting the same, a connection operated by said primary slide arranged to separate said friction wheels while the one is being adjusted in respect to the other, ratchet teeth on said fixed guide, a pawl on said secondary slide engageable with said ratchet teeth to lock said secondary slide in different positions, a pawl trip frictionally anchored to said fixed guide and having a limited movement only in respect to said secondary slide, and a controller rod connected to said transmission mechanism and to said primary slide, forward and rearward movements of said rod serving to adjust the transmission mechanism, and oscillatory movements of said rod on its own axis serving to adjust said steering mechanism.

10. In a motor-propelled vehicle, the combination with a steering mechanism and a variable speed transmission mechanism, of a common controller for said two mechanisms, said variable speed transmission mechanism including a regulating device arranged to be set by said common controller in different positions for the transmission of different speeds.

11. In a motor propelled vehicle, the combination with a steering mechanism and a variable speed transmission mechanism, of a common controller for the said two mechanisms, mounted for movement on two different lines, the movement on one line serving to regulate the speed and the movement on the other line serving to regulate the direction of travel, said speed transmission mechanism comprising a regulating device adapted to be set by said common controller, in different positions for the transmission of different speeds.

12. In a motor propelled vehicle, the combination with a steering mechanism and a variable speed transmission mechanism, of a common controller for the said two mechanisms, mounted for movement on two different lines, the movement on one line serving to regulate the speed and the movement on the other line serving to regulate the direction of travel, said speed transmission mechanism comprising a regulating device adapted to be set by said common controller in different positions for the transmission of different speeds, and means whereby said regulating device may be released at will by movements of said common controller.

13. In a motor propelled vehicle, the combination with a steering mechanism and a motor propelled transmission mechanism, of a common controller having two different movements, the one movement thereof serving to manipulate the one mechanism and the other movement thereof serving to manipulate the other mechanism.

14. In a motor propelled vehicle, the combination with a steering mechanism and a motor propelled transmission mechanism, of a common controller for said two mechanisms having two different movements, the one movement serving to manipulate said steering mechanism without disturbing said transmission mechanism, and the other movement of said controller serving to manipulate said transmission mechanism without disturbing said steering mechanism.

15. In a motor-propelled vehicle, the combination with steering mechanism and a reversible motor driven transmission mechanism, of a common controller operatively connected to said two mechanisms, and having three actions, one for controlling said steering mechanism and the other two for controlling, at will, the transmission of power, through said transmission mechanism, for forward and reverse travel.

16. In a motor-propelled vehicle, the combination with transmission and steering mechanisms, of a common controller operatively connected thereto and having two functions, one for controlling said steering mechanism and the other for controlling said transmission mechanism, and a pair of reins attached to and extended from said common controller.

17. In a motor-propelled vehicle, the combination with a steering mechanism and a motor driven transmission mechanism, of a common controller operatively connected to said two mechanisms and having two actions, the one for controlling said steering mechanism, and the other for controlling said transmission mechanism, yielding means tending to move said common controller forward, and a pair of reins connected to and extended rearward from said controller, and operative, in opposition to said yielding means, for moving said controller bodily rearward and for otherwise manipulation of the same.

18. In a motor-propelled vehicle, the combination with steering mechanism and a reversible transmission mechanism, of a common controller operatively connected to said two mechanisms and having three actions, the one for controlling said steering mechanism, and the other two for controlling, at will, the transmission of power through said transmission mechanism, for forward and reverse travel.

19. In a motor-propelled vehicle, the combination with steering mechanism and a reversible transmission mechanism, of a common controller operatively connected to said two mechanisms and having three actions, the one for controlling said steering mechanism, and the other two for controlling, at will, the transmission of power through said transmission mechanism, for forward and reverse travel, and a pair of reins connected to said common controller and extended therefrom for manipulating the same from a distant point.

In testimony whereof I affix my signature in presence of two witnesses.

VITUS A. BOKER.

Witnesses:
HARRY D. KILGORE,
F. D. MERCHANT.